United States Patent [19]

Owen

[11] Patent Number: 5,428,601
[45] Date of Patent: Jun. 27, 1995

[54] METHOD OF OPERATING A COMMUNICATIONS SYSTEM, A COMMUNICATIONS SYSTEM AND A SECONDARY STATION FOR USE IN THE SYSTEM

[75] Inventor: Frank C. G. Owen, Redhill, England

[73] Assignee: U.S. Philips Corporation, New York, N.Y.

[21] Appl. No.: 221,275

[22] Filed: Mar. 29, 1994

Related U.S. Application Data

[63] Continuation of Ser. No. 728,923, Jul. 12, 1991, abandoned.

[30] Foreign Application Priority Data

Jul. 23, 1990 [GB] United Kingdom ............... 9016113

[51] Int. Cl.$^6$ ........................... H04J 3/16; H04Q 7/34
[52] U.S. Cl. .................................. 370/17; 370/29; 370/50; 370/69.1; 370/95.1; 379/60; 455/33.2; 455/34.2
[58] Field of Search ......... 370/13, 17, 18, 24, 370/29, 30, 50, 69.1, 70, 95.1, 95.2, 95.3; 379/59, 60; 455/33.1, 33.2, 33.3, 33.4, 34.1, 34.2, 67.1

[56] References Cited

U.S. PATENT DOCUMENTS

| | | | |
|---|---|---|---|
| 4,754,450 | 6/1988 | Lynk, Jr. et al. | 370/50 |
| 4,866,710 | 9/1989 | Schaeffer | 370/50 |
| 5,042,082 | 8/1991 | Dahlin | 370/95.1 |

OTHER PUBLICATIONS

CT2 Plus, A Proposal for a Canadian Common Raido Interface Standard, Issue 1.2, Jul. 1990, Publisher: Bell Northern Research.
MPT 1375: Common Air Interface, May 1989 ISBN 1-870837-86-X; pp. i-vi; 1-6; 2-1 through 2-39; 3-1 through 3-34; 4-1 through 4-26.

*Primary Examiner*—Alpus Hsu
*Attorney, Agent, or Firm*—Anne E. Barschall

[57] ABSTRACT

A method of operating a communications system, particularly a FDM-TDD cordless telephony system, in which, in order to expedite handover, a portable secondary station builds up a record of the status and quality of the other FDM channels in the system by every 1 in n (where n is an integer greater than one) TDD frames monitoring another FDM channel. The value of n is adaptive in that, as the quality of its existing channel deteriorates, the value of n decreases, thereby updating its record more rapidly. At handover, the secondary station is able to choose immediately an acceptable alternative channel, thereby avoiding the time overhead of scanning all the other FDM channels.

35 Claims, 3 Drawing Sheets

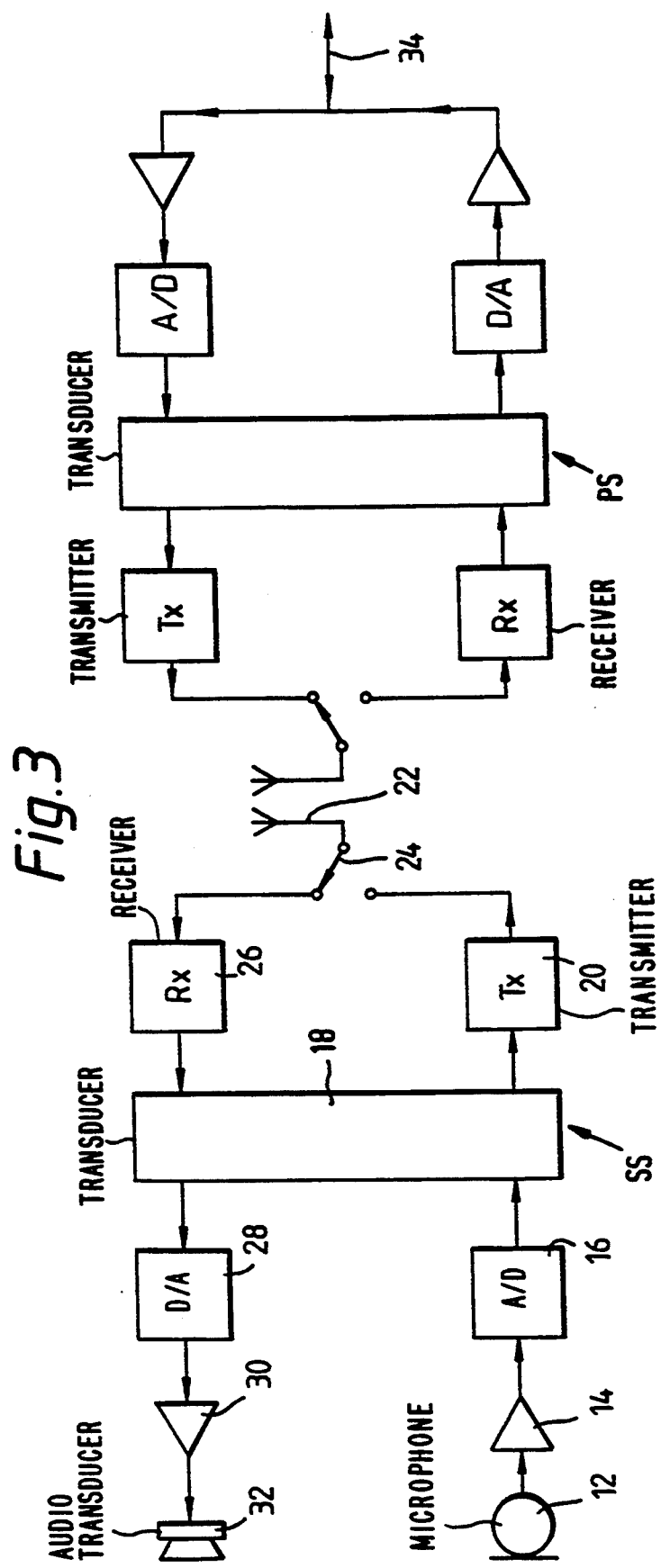

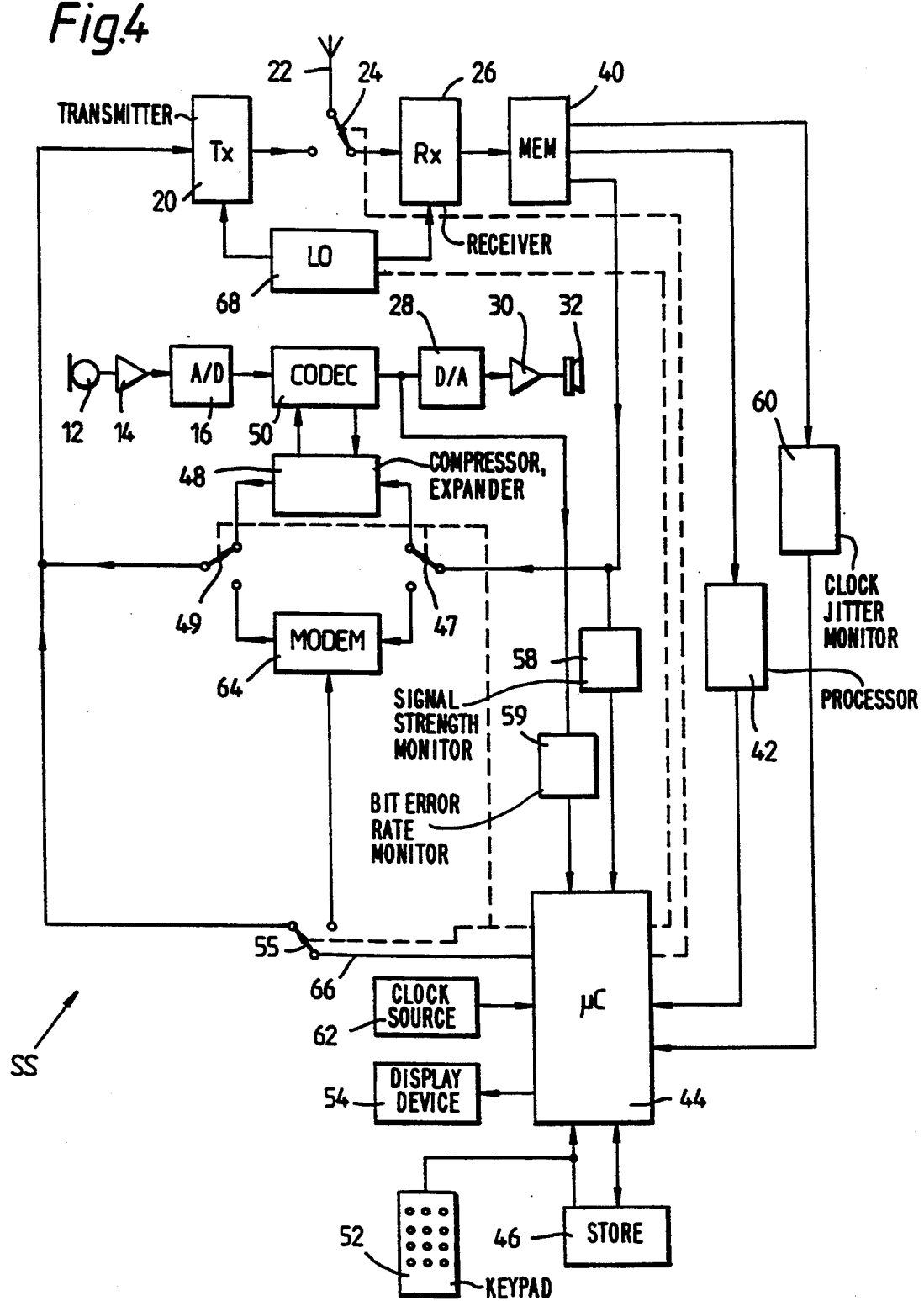

METHOD OF OPERATING A COMMUNICATIONS SYSTEM, A COMMUNICATIONS SYSTEM AND A SECONDARY STATION FOR USE IN THE SYSTEM

This is a continuation of application Ser. No. 07/728,923, filed Jul. 12, 1991, now abandoned.

BACKGROUND OF THE INVENTION

1. Field of the Invention

The present invention relates to a method of operating a communications system and particularly, but not exclusively, to a method of handover in a frequency division multiplex (FDM)-time division duplex (TDD) communications system.

The present invention also relates to a communications system for operating in accordance with the method and to a secondary station for use in the system.

2. Related Art

A known FDM-TDD cordless telephony system is known in Great Britain as CT2 and the common air interface is disclosed in MPT 1375 "Common Air Interface Specification" to be used for the interworking between cordless telephone apparatus including public access services, published by the Department of Trade and Industry, London. The CT2 system comprises a plurality of fixed, geographically separate primary (or base) stations which are connected by landline links to interface with the public switched telephone network (PSTN). The primary stations form a plurality of zones which for CT2 are not necessarily contiguous. Each primary station has at least one transceiving means capable of communicating by any one of a plurality of FDM-TDD channels with a secondary station which is able to roam within its cell. When a secondary station is sufficiently far from its primary station, the interference on the existing FDM-TDD channel becomes unacceptable, handover to another channel or to another, in range, primary station becomes necessary if the call is to continue. Under the provisions of Section 17.5 of MPT 1375, a secondary station must wait at least three seconds before it is able to initiate a handover routine. This routine requires the secondary station to monitor all the other FDM channels in the system noting their quality and then requesting the primary station to effect handover to a channel which is considered to be acceptable. As part of the handover routine, information including the addresses of the respective parties participating in a call and authorisations may be communicated. The handover routine incurs a time delay penalty which, if it results in there being no valid handshake exchanged within ten seconds between the primary station and secondary station, then the call will be curtailed and the user cut off.

SUMMARY OF THE INVENTION

An object of the present invention is to operate a communications system in a way as to facilitate handover in as short a time as is practically possible.

According to one aspect of the present invention there is provided a method of operating a frequency division multiplex (FDM)-time division duplex (TDD) communications system comprising at least one primary station and at least one secondary station and in which successive TDD frames in each FDM channel comprises a transmit half frame and a receive half frame, the method comprising the or a secondary station communicating with a primary station on an existing one of a plurality FDM channels and monitoring a channel quality parameter in another FDM channel during the receive half frame of every 1 in n (where n is an integer greater than one) TDD frames.

The present invention is based on the recognition of the fact that in FDM-TDD system such as CT2 the transceiver in a secondary station is always either transmitting or receiving when conducting a call. Hence, unless the secondary station has a second transceiver, there is no opportunity during the call for the secondary station to monitor the quality of alternative FDM-channels and/or primary stations if the existing FDM-channel becomes unacceptable unless the call is interrupted. However, by the secondary station using one receive half frame in n TDD frames to monitor the quality of other FDM-channels in the system, then when its existing channel becomes unacceptable, the secondary station is able to request handover to a FDM-channel which it knows already is acceptable and hence save time and avoid the possibility of being cut off.

In an embodiment of the method in accordance with the present invention, the value of n is high, say 200, when the existing channel quality is acceptable. However, as the existing channel quality decreases then the value of n decreases to, say, ten just prior to handover being requested. In a situation where, say, signal strength is being monitored in the existing channel, then for, say, every 10 dB drop in signal strength the rate of monitoring increases by a factor of 2. By varying the rate of monitoring, which is related to the value of n, the secondary station is able to build up a record of channel quality in a store which record is updated more rapidly as the need of for handover becomes greater.

In determining whether handover is necessary, a secondary station monitors one or more parameters which are indicative of channel quality, these parameters comprise bit error rate, signal strength and clock jitter. When a secondary station determines that handover is necessary and because a call is in progress on its existing channel, negotiations connected with handover may be conducted on the channel to which the secondary station wants to be handed over to during the transmit half frame of a sequence of the 1 in n TDD frames. Conveniently the said transmit half frame is the complementary half frame to the receive half frame used for channel monitoring.

In order to compensate for the loss of digitised speech when the secondary channel is monitoring another channel, the voice data from a preceding TDD frame may be inserted so that at least the risk of a perceptible change in pitch is avoided.

Each FDM channel includes a control channel which carries for example a low data rate signal comprising the identity of the secondary station. In order to avoid the risk of error checking circuitry rejecting a call due to data bits being lost due to the retuning of the secondary station every 1 in n frames, the secondary station inserts data bits at positions corresponding to the missing bits.

According to another aspect of the present invention there is provided a frequency division multiplex (FDM)-time division duplex (TDD) communications system comprising at least one primary station and at least one secondary station capable of communicating with each other over an existing one of a plurality of FDM channels, wherein a secondary station has a transmitter and a receiver, means for tuning the transmitter and receiver to any one of the FDM channel frequencies, control means for causing the tuning means to retune at least the receiver for the receive half frame of every 1 in n (where n is an integer greater than one) TDD frames to another FDM channel and means for monitoring a channel quality parameter in the another FDM channel.

According to a further aspect of the present invention there is provided a secondary station for use in a frequency division multiplex (FDM)-time division duplex (TDD) communications system comprising at least one primary station and at least one secondary station capable of communicating with each other over an existing one of a plurality of FDM channels, wherein a secondary station has a transmitter and a receiver, means for tuning the transmitter and receiver to any one of the FDM channel frequencies, control means for causing the tuning means to retune at least the receiver for the receive half frame of every 1 in n (where n is an integer greater than one) TDD frames to another FDM channel and means for monitoring a channel quality parameter in the another FDM channel.

BRIEF DESCRIPTION OF THE DRAWINGS

The present invention will now be described, by way of example, with reference to the accompanying drawings, wherein;

FIG. 3 is a block schematic diagram of a primary station and a secondary station, and FIG. 4 is a more detailed block schematic diagram of a secondary station.

In the drawings the same reference numerals have been used to indicate corresponding features.

DETAILED DESCRIPTION OF THE PREFERRED EMBODIMENTS

Figure 1:
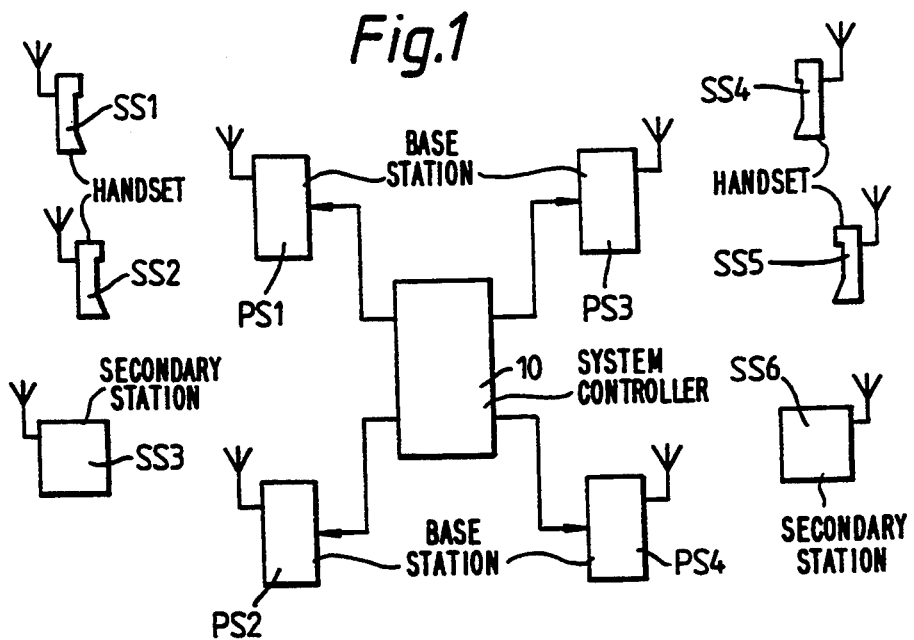
FIG. 1 is a diagram of a cordless telephone system.

Referring to FIG. 1, the illustrated cordless telephone system comprises a plurality of geographically separate, fixed primary (or base) stations PS1, PS2, PS3, PS4, each of which includes one or more radio transceivers for communicating with a radio transceiver in a secondary station (or handset) SS1 to SS6 which is able to roam into and out of range of the respective primary stations PS1 to PS4. A system controller 10 is connected by landline to each of the primary stations PS1 to PS4.

For convenience of description, the operation of the illustrated system will be described with reference to the above identified CT2 cordless telephony system. This system is an FDM system having 40 frequency channels which are respectively allocated to calls. Each frequency channel is divided into TDD frames of 2 ms duration. Speech is digitised and compressed for transmission in its respective half frame at 72 kbits/sec. Communication is always between a primary station and a secondary station, there is no provision for direct communication between two secondary stations. As mentioned in the preamble, one problem with CT2 is that handover from an existing FDM channel or to another primary station occurs when the existing channel becomes unacceptable. As part of the handover process, the secondary station has to scan the other 39 FDM channels to determine if they are occupied and, if not, whether they are of an acceptable standard. Once an acceptable channel has been identified, then the handover can be initiated. CT2 specifies that there must be a minimum delay of three seconds before handover can be initiated and that, if it results in there being no valid handshake exchanged between the primary station and the secondary station within another seven seconds, then the call will be curtailed and the secondary station cut off.

The method in accordance with the present invention is intended to reduce significantly the time taken to handover by avoiding the need to assess the status and quality of the other 39 FDM channels at the time when it appears that the existing channel is deteriorating. This is done by the secondary station building up a record of the status and quality of the other 39 FDM channels so that when the existing channel becomes unacceptable a search through the other channels is unnecessary, thereby saving time.

Figure 2:
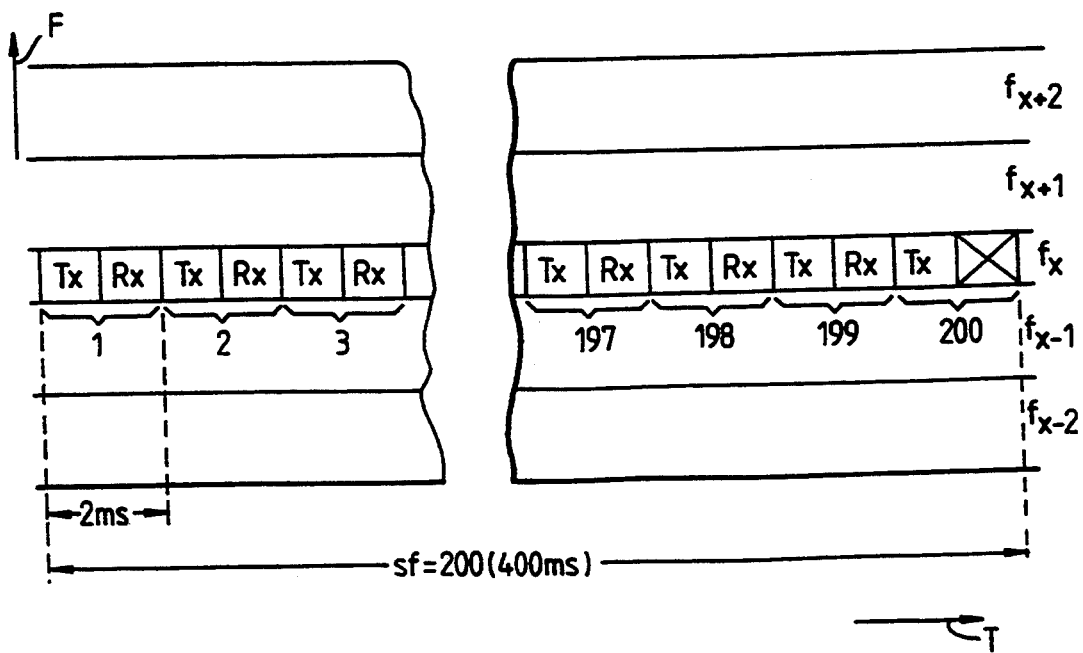
FIG. 2 is a time (T) versus frequency (F) diagram of the frequency division multiplex (FDM)-time division duplex (TDD) channel allocation.

FIG. 2 illustrates diagrammatically a number of FDM channels $f_{x+2}$ to $f_{x-2}$. It will be assumed that a call is taking place on channel $f_x$. Each TDD frame of 2 ms is divided into two half frames one devoted to transmit (Tx) and the other to receive (Rx). In order for a secondary station to build up a record of the status and quality of the other channels, the receive half frame of every 1 in n (where n is an integer greater than one) TDD frames is used to monitor another FDM channel. In order to do this the transceiver in the secondary station has to tune its receiver section to the frequency of the channel concerned and then at the end of the half frame retune itself back to the existing channel. In effect a superframe (sf) is created in which the last receive half frame of the last TDD frame is used for building up a channel record. The length of a superframe, that is the value of n, is adaptable. By way of example, if the existing FDM channel quality is high, then the superframe (sf) can be 200 TDD frames which in CT2 would provide a full sequential scan of all 39 remaining channels in approximately 15 seconds. However, if it is sensed that the existing channel is deteriorating due to, say, the bit error rate (BER) increasing, the signal strength decreasing and/or clock jitter being detected resulting from the recovered clock signal being affected by another signal on the same channel, then the length of the superframe, that is the value n, is decreased progressively in, say, steps, thereby enabling the sequential scan of the channels to be completed in a shorter time. A minimum value of n=10 would enable a full scan of 39 FDM channels to be completed in approximately 1 second. A possible algorithm for adapting the value of n is that n is adjusted in response to a 10 dB change in signal strength from the previous level at which n was changed to its current value.

When the secondary station determines that its existing FDM channel has become unacceptable and that handover is necessary, it utilises the transmit half of a TDD frame in a succession of superframes, conveniently the complementary half to that used for monitoring the other FDM channels, and transmits to its existing primary station or to a new primary station on a FDM channel which it has determined from its monitoring operation is available and is of an acceptable quality. Since the secondary station already has a call in progress, it transmits a handover link re-establishment request during the transmit half of the selected frame on the new FDM channel as part of the preparations for handover onto the new channel. As the size of the superframes has been decreased to its minimum value, the selected TDD frame will occur fairly frequently. The link request itself will include details of the secondary station's identity and, optionally, the secondary station's authentication.

The primary station will reply in the complementary half of the selected TDD frame in the new FDM channel to acknowledge receipt of the request and this new superframe link will continue until handover is agreed.

Once the existing or new primary station agrees to handover, it transmits its agreement on the new FDM channel. Thereafter handover is implemented and the call in progress is transferred to the new FDM channel. Finally the secondary station notifies its primary station that it has left its previous FDM channel.

Variants of the above sequence of operations comprise the primary station initiating the handover command and the primary station clearing down the old link.

When the channel quality is high and speech is being transmitted then the loss of one TDD frame will probably not be perceptible to a user. As the existing channel deteriorates, then the reproduced speech will itself deteriorate. In order to reduce the perception of the loss of a TDD frame, it is proposed that voice data from the previous TDD frame be repeated as this will contain the same pitch information. An alternative would be to insert a dummy TDD frame but it would not necessarily be at the right pitch.

Another problem associated with devoting one TDD frame in a superframe to scanning another channel is that with CT2 there is a control channel in parallel with the message (or speech) channel, which control channel carries bits which are used to build up the identity code of the secondary station. Thus, if two bits are lost in every superframe due to one TDD frame being used for monitoring another channel, then a controller in the secondary station may register an error in its handshake and assume that a fault condition exists. Such a problem can be overcome in a number of ways because the secondary station knows in advance that it will lose two bits at a specific position. Firstly, since only two binary bits will be omitted, when error-checking circuity in the secondary station detects the existence of such an error, it rechecks the address by successively inserting the combinations 10, 01, 00 and 11 into the missing positions in the address codeword as received. If the address decodes satisfactorily, then it assumes that everything is normal. Alternatively, if an error condition persists, this is due to some other source. Secondly, since the secondary station knows its own address, whenever a pair of bits are detected as being missing, it simply inserts the corresponding bits from its own address and rechecks the received address.

FIG. 3 is a block schematic diagram of an air interface high level transmission plan and shows a primary station PS and a secondary station SS. Referring initially to the secondary station, a microphone 12 is connected by way of an amplifier 14 to an analogue to digital converter (ADC) 16. The ADC 16 also includes a CODEC and a compander. The companded, digitised speech is sent by way of a transcoder 18 to a transmitter 20. The signal to be transmitted is coupled to an antenna 22 by way of a change-over switch 24.

A receiver 26 is coupled by way of the switch 24 to the antenna 22. An output of the receiver is coupled by way of the transcoder 18 to a digital to analogue converter (DAC) 28 which includes means for expanding the output from the transcoder and a CODEC for decoding the signal. The analogue signal from the DAC 28 is amplified in an amplifier 30 and reproduced in an audio transducer 32.

The construction of the primary station is much the same as that of the secondary station but with the significant difference that, because it acts as a relay station, a microphone and audio transducer are not provided but instead an analogue version of a received signal is supplied to an output line 34 which may be connected to the public switched telephone network. The line 34 also carries signals to be transmitted to a secondary station.

FIG. 4 is a block diagram of a secondary station for use in the cordless telephony system shown in FIG. 1. The secondary station SS comprises a transmitter 20 connectable by way of a change-over switch 24 to an antenna 22. A receiver 26 is also connectable by way of the switch 24 to the antenna 22. A multiplexer 40 is connected to an output of the receiver to separate digitised speech from control data being transmitted in the control channel. The control data is supplied to a processing stage 42 which includes error-checking means and an output is supplied to a microcontroller 44. The microcontroller 44 controls the operation and internal organisation of the secondary station and has a store 46 connected to it for storing amongst other things details of the status and quality of the other FDM channels in the system.

Digitised speech separated by the multiplexer 40 from the remainder of the received signal is supplied by way of a change-over switch 47 to a signal compressor/expander 48, the expanded digitised speech is supplied to CODEC 50 in which it is decoded and passed to DAC 28, the analogue output from which is amplified in amplifier 30 and passed to audio transducer 32.

Analogue speech from the microphone 12 is amplified in amplifier 14 and digitised in ADC 16. The signal is suitably encoded in the CODEC 50, compressed in the compressor/expander 48 and passed by way of change-over switch 49 to the transmitter 20 by way of a change-over switch 49.

A keypad 52 is connected to the microcontroller 44, for keying in data such as a called party's telephone number. The microcontroller 44 causes the keyed-in data to be displayed on a display device 54. The microcontroller 44 also adds the necessary signalling to the keyed-in data which is conveyed by way of a change-over switch 55 to the transmitter 20.

The switches 24, 47, 49 and 55 are controlled by the microcontroller 44.

The microcontroller 44 determines the size of the superframe, that is the value of n, by monitoring its existing FDM channel. Parameters which are monitored to determine the quality of the existing channel include signal strength of the received signal which is determined by a device 58, bit error rate in the output from, say, the CODEC 50 which is determined by a device 59 and/or clock jitter in the clock signal as recovered by a device 60 having an output connected to the microcontroller 44. A clock source 62 is connected to the microcontroller 44 to provide a reference signal against which the recovered clock signal is compared.

In order to examine another FDM channel every 1 in n TDD frames, the microcontroller 44 instructs a local oscillator 68 connected to the transmitter 20 and the receiver 26 to change frequency by a predetermined amount for a one half TDD frame so that the receiver 26 is tuned to the other channel. The device 58 measures the strength of any signal present in the other channel and this information is passed to the microcontroller 44 for storage in the store 46 which has a record of channel availability and quality.

In the event of the microcontroller 44 determining that its existing FDM channel is deteriorating, it reduces the length of the superframe and in so doing increases the frequency that each of the other channels is monitored.

If the microcontroller 44 determines that handover is necessary, it sends a handover signal to a low rate modem 64 by way of a line 66 and the switch 55. The switches 47 and 49 are also changed over to an input and an output of the modem 64.

In the course of negotiating for another channel or primary station to be handed over to, the microcontroller 44 scans its record of the quality of the other channels and chooses one. Details of this new channel are included in the negotiations with the primary station.

From reading the present disclosure, other modifications will be apparent to persons skilled in the art. Such modifications may involve other features which are already known in the design, manufacture and use of cordless telephony systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of operating a frequency division multiplex, FDM, -time division duplex, TDD, communications system comprising at least one primary station and one secondary station, Wherein the one primary and the one secondary station are communicating with each other in successive TDD frames in a plurality of FDM channels, each TDD frame including a transmit half frame and a receive half frame, the method comprising
   communicating between one secondary station and one primary station on one of the plurality FDM channels and
   monitoring, in the one secondary station, a channel quality parameter in at least one other FDM channel during the receive half frame of one of every n TDD frames, where n is an integer greater than one.

2. A method as claimed in claim 1, further comprising the steps of
   monitoring the communicating one of the FDM channels;
   decreasing the value of n in response to the quality of the communicating one of the FDM channels deteriorating.

3. A method as claimed in claim 1, wherein the channel quality parameter monitored comprises a measurement of signal strength.

4. A method as claimed in claim 3, further comprising the steps of, in the secondary stations
   monitoring the communicating one of the FDM channels; and
   altering the value of n in response to a 10 dB change in the signal strength of the communicating one of the FDM channels.

5. A method as claimed in claim 1,
   wherein the monitoring step comprises monitoring the channel quality parameter in a plurality of other FDM channels; and
   further comprising the step of storing, in the secondary station in response to the monitoring step, a respective indication of the quality of each of the plurality of other FDM channels, whereby the primary station need not communicate a list of free channels to the secondary station and need not determine such a list.

6. A method as claimed in claim 5, further comprising the steps of
   in the secondary station, monitoring the quality of the communicating one of the FDM channels; and
   transmitting, by the one secondary station, in response to an indication that the quality of the communicating one of the FDM channels has deteriorated below an acceptable level, a request for handover of a call to one of the other FDM channels that according to the stored indications is of acceptable quality, said transmitting being made on the one of the other FDM channels during the transmit half frame of a sequence of one in every n TDD frames.

7. A method as claimed in claimed in claim 6, further comprising the step of initiating the handover in response to a bit error rate in the communicating one of the FDM channels becoming unacceptable.

8. A method as claimed in claim 6, further comprising the step of initiating the handover in response to a signal strength in the communicating one of the FDM channels becoming unacceptable.

9. A method as claimed in claim 6, further comprising the step of initiating the handover in response to clock jitter being detected in the communicating one of the FDM channels.

10. A method as claimed in claim 1,
    wherein the communicating step comprises receiving, in the one secondary station, a received signal from the one primary station; and
    further comprising the step of, in the one secondary station, repeating a preceding TDD frame of the received signals during the one of every n TDD frames, whereby data lost during monitoring is replaced.

11. A method as claimed in claim 1, wherein each FDM channel includes a control channel, and further comprising the steps of
    transmitting, by the one primary station, data bits relating to the one secondary station's identity over a plurality of TDD frames, and
    inserting, by the one secondary station, data bits to replace those lost during the monitoring step.

12. A method as claimed in claim 11, wherein the data bits inserted correspond to those bits relating to the one secondary station's identity which should have been present in the one in every n TDD frames.

13. A method as claimed in claim 11, wherein
    the data bits are binary bits and in an error checking process in the one secondary station, various combinations of binary bits are inserted at those locations in the one secondary station's identity which would have been filled by the bits in the one in every n TDD frames.

14. The method of claim 1 wherein there are a plurality of pairs of primary and secondary stations all performing the communicating and monitoring steps of the method.

15. Method of claim 1 in which the primary station does not monitor channel quality.

16. A frequency division multiplex, FDM, -time division duplex, TDD, communications system comprising
at least one primary station and
at least one secondary station for communicating with the primary station over one of a plurality of FDM channels, the secondary station including
a transmitter,
a receiver,
means for tuning the transmitter and receiver to any one of the FDM channels,
control means for causing the tuning means to retune at least the receiver, for a receive half frame of one in every n TDD frames, to at least one other FDM channel, where n is an integer greater than one, and
means for monitoring a channel quality parameter in the at least one other FDM channel.

17. A system as claimed in claim 16, wherein the secondary station has storage means for storing indications of the quality of the at least one other FDM channel, in response to an output of the means for monitoring, whereby the primary station need not communicate a list of free channels to the secondary station and need not determine such a list.

18. A system as claimed in claim 17, wherein
the secondary station has means for monitoring the quality of the communicating one of the FDM channels and
the control means is adapted to reduce the value of n in response to the quality of the communicating one of the FDM channels deteriorating.

19. A system as claimed in claim 18, wherein the control means, in response to the communicating one of the FDM channels becoming unacceptable, initiates a handover routine to a channel which is acceptable according to the indications stored in the storage means.

20. A system as claimed in claim 19, wherein the control means instructs the tuning means to tune the transmitter to the frequency of the channel which the secondary station has selected as being acceptable in the transmit half frame of a sequence of the one in every n TDD frames in order to initiate negotiations connected with the handover of the secondary station.

21. The system of claim 18 wherein the means for monitoring the at least one other FDM channel and the means for monitoring the communicating FDM channel are the same means for monitoring.

22. A system as claimed in claim 16, wherein
the secondary station has means for monitoring the quality of the communicating one of the FDM channels and
the control means is adapted to reduce the value of n in response to the quality of the communicating one of FDM channels deteriorating.

23. The system of claim 22 wherein the means for monitoring the at least one other FDM channel and the means for monitoring the communicating FDM channel are same means for monitoring.

24. A system as claimed in claim 16, wherein the control means repeats signal data from a preceding TDD frame for that lost during operation of the means for monitoring.

25. A system as claimed in claim 16, wherein
the secondary station has means for recovering its identity from data bits transmitted over a plurality of TDD frames; and
the control means provides data bits to replace those lost during operation of the means for monitoring.

26. A secondary station for use in a frequency division multiplex, FDM, -time division duplex, TDD, communication system comprising at least one primary station and at least one secondary station for communicating with the primary station over a communicating one of a plurality of FDM channels, the secondary station comprising
a transmitter,
a receiver,
means for tuning the transmitter and receiver to any one of the FDM channels,
control means for causing the tuning means to retune at least the receiver, for a receive half frame of one in every n TDD frames, to at least one other FDM channel, where n is an integer greater than one, and
means for monitoring a channel quality parameter in the at least one other FDM channel.

27. A secondary station as claimed in claim 26, further comprising storage means for storing indications of the quality of the at least one other FDM channel, in response to an output of the means for monitoring, whereby the primary station need not communicate a list of free channels to the secondary station and need not determine such a list.

28. The secondary station as claimed in claim 27,
further comprising means for monitoring the quality of the communicating one of the FDM channels and
wherein the control means is adapted to reduce the value of n in response to the quality of the communicating one of the FDM channels deteriorating.

29. A secondary station as claimed in claim 28, wherein the control means, in response to the communicating one of the FDM channels becoming unacceptable, initiates a handover routine to a channel which is acceptable according to the indications stored in the storage means.

30. A secondary station as claimed in claim 27, wherein the control means instructs the tuning means to tune the transmitter to the frequency of the channel which the secondary station has selected as being acceptable in a transmit half frame of a sequence of the one in every n TDD frames in order to initiate negotiations connected with the handover routine.

31. The system of claim 28 wherein the means for monitoring the at least one other FDM channel and the means for monitoring the communicating FDM channel are the same means for monitoring.

32. The secondary station as claimed in claim 26,
further comprising means for monitoring the quality of the communicating one of the FDM channels and
wherein the control means is adapted to reduce the value of n in response to the quality of the communicating one of FDM channels deteriorating.

33. The system of claim 32 wherein the means for monitoring the at least one other FDM channel and the means for monitoring the communicating FDM channel are the same means for monitoring.

34. A secondary station as claimed in claim 26, wherein the control means repeats signal data from a preceding TDD frame for that lost during operation of the means for monitoring.

35. A secondary station as claimed in claim 26,
further comprising means for recovering its identity from data bits transmitted over a plurality of TDD frames; and
wherein the control means provides data bits to replace those lost during operation of the means for monitoring.

* * * * *